(12) United States Patent
Song et al.

(10) Patent No.: US 9,552,585 B2
(45) Date of Patent: Jan. 24, 2017

(54) SERVER AND METHOD FOR PROVIDING SURVEY OF BROADCASTING PROGRAM

(71) Applicant: KT CORPORATION, Seongnam (KR)

(72) Inventors: Min-Sook Song, Seoul (KR); Jin-Han Kim, Gunpo-si (KR); Wang-Sung Chun, Anyang-si (KR)

(73) Assignee: KT Corporation, Seongnam (KR)

( * ) Notice: Subject to any disclaimer, the term of this patent is extended or adjusted under 35 U.S.C. 154(b) by 183 days.

(21) Appl. No.: 13/625,474

(22) Filed: Sep. 24, 2012

(65) Prior Publication Data

US 2013/0081115 A1 Mar. 28, 2013

(30) Foreign Application Priority Data

Sep. 22, 2011 (KR) .......... 10-2011-0095602

(51) Int. Cl.
*G06F 7/04* (2006.01)
*G06F 15/16* (2006.01)
*G06F 17/30* (2006.01)
*H04L 29/06* (2006.01)
*G06Q 30/02* (2012.01)
*G06Q 30/06* (2012.01)

(52) U.S. Cl.
CPC .............. *G06Q 30/02* (2013.01); *G06Q 30/06* (2013.01)

(58) Field of Classification Search
CPC ................................. G06Q 30/02; G06Q 30/06
USPC ............................................................ 726/5
See application file for complete search history.

(56) References Cited

U.S. PATENT DOCUMENTS

| 2006/0074966 A1* | 4/2006 | Isokoski et al. .............. 707/102 |
| 2009/0029671 A1* | 1/2009 | Cho et al. ..................... 455/345 |
| 2009/0222854 A1* | 9/2009 | Cansler et al. ................. 725/35 |
| 2009/0265238 A1* | 10/2009 | Lee et al. ........................ 705/14 |
| 2009/0271837 A1* | 10/2009 | Kim ................... H04N 7/17318 725/110 |
| 2010/0241707 A1* | 9/2010 | Burton et al. ................ 709/203 |

(Continued)

FOREIGN PATENT DOCUMENTS

| KR | 1020000037181 A | 7/2000 |
| KR | 1020100058700 A | 6/2010 |

(Continued)

OTHER PUBLICATIONS

Lydia M. J.; A Survey of Perceptual Evaluations and Requirements of Three-Dimensional TV; Mar. 2004; IEEE: vol. 14, No. 3; pp. 381-391.*

*Primary Examiner* — Monjour Rahim
(74) *Attorney, Agent, or Firm* — Sughrue Mion, PLLC

(57) ABSTRACT

A survey providing apparatus includes a reception unit configured to receive a survey participation signal, from a user device, related to the broadcasting program that is being reproduced in a broadcasting device, a user authentication unit configured to authenticate a user based on identification information of the user device included in the received survey participation signal and user information that is previously stored in a database, a transmission unit configured to transmit a survey list for the broadcasting program to the user device and a survey result generation unit configured to generate a survey result based on a survey response to the survey list and the user information, wherein the transmission unit is further configured to transmit the generated survey result to the broadcasting device.

16 Claims, 3 Drawing Sheets

(56) References Cited

U.S. PATENT DOCUMENTS

| | | | |
|---|---|---|---|
| 2011/0067044 A1* | 3/2011 | Albo .............................. | 725/13 |
| 2011/0145848 A1* | 6/2011 | Moskowitz ............ | H04H 60/33 |
| | | | 725/13 |
| 2012/0276515 A1* | 11/2012 | Ueno ..................... | G06Q 30/02 |
| | | | 434/350 |

FOREIGN PATENT DOCUMENTS

| | | |
|---|---|---|
| KR | 100980643 B | 9/2010 |
| KR | 1020100132039 A | 12/2010 |

* cited by examiner

– 1 –

SERVER AND METHOD FOR PROVIDING SURVEY OF BROADCASTING PROGRAM

CROSS-REFERENCE TO RELATED APPLICATION

This application claims priority from the Korean Patent Application No. 10-2011-0095602, filed on Sep. 22, 2011 in the Korean Intellectual Property Office, the entire disclosure of which is incorporated herein by reference in its entirety.

BACKGROUND

1. Field

Apparatuses and methods consistent with exemplary embodiments broadly relate to a server and a method for providing a survey of a broadcasting program.

2. Description of the Related Art

With recent development of technologies and with change in demands of viewers, the broadcasting environment has been changed. Especially, with the development of internet protocol television (IPTV), viewers no longer one-sidedly view programs provided from a broadcasting station. Viewers can be provided with games, education information, life information, and so forth, and utilize a two-way broadcasting service that enables intercommunication between viewers and a broadcasting station.

When buying a product through a broadcasting program such as home shopping, a viewer may have worries in choosing one of various options of the product such as colors and designs. In order to see comments, views of experts or third parties with regard to the product or another associated product, the viewer may search related information through the internet.

SUMMARY

Accordingly, it is an aspect to provide a server and a method capable of providing a survey of a broadcasting program, and furthermore, results of the survey.

According to an aspect of exemplary embodiments, there is provided an apparatus for providing a survey of a program. The apparatus comprises a receiver configured to receive a first signal related to the program that is being reproduced in a first device, an authenticator configured to authenticate a user based on first information of a second device included in the received first signal and second information that is stored in a database, a transmitter configured to transmit a survey list related to the program to the second device and a result generator configured to generate a result based on at least one response to the survey list and the second information, wherein the at least one response is received by the receiver, and the transmitter is further configured to transmit the generated result to the first device.

The first signal may be generated in response to a second signal, and the second signal may be transmitted from the first device to the second device when an icon displayed on the first device is selected by first input to the first device.

An application of the second device may be executed based on the second signal, and the first signal may be received from the second device and generated by the application.

The survey list may be displayed in the second device, and the at least one response may be input through an interface of the application.

The result may comprise preferences of users based on responses received from a plurality of user devices.

The survey list maybe transmitted to the device after receiving a second signal from the second device, and the survey list maybe generated based on the second information that is stored in the database if the user is authenticated.

The second information may be newly input and inserted into the second signal if the user is not authenticated, and the survey list may be generated based on the newly input second information.

The transmitter maybe further configured to transmit at least one from among information about an advertisement and information about a broadcasting, based on the result.

According to another aspect of exemplary embodiments, there is provided a method of providing a survey of a program. The method includes receiving a first signal related to the program that is being reproduced in a first device, authenticating a user based on first information of a second device, included in the received first signal and second information that is stored in a database, transmitting a survey list related to the program to the second device, receiving at least one response, generating a result based on the at least one response to the survey list and the second information and transmitting the generated result to the first device.

The first signal may be generated in response to a second signal, and the second signal may be transmitted from the first device to the second device when an icon displayed on the first device is selected by input to the first device.

An application of the device may be executed based on the second signal, and the first signal may be received from the second device and generated by the application.

The survey list may be displayed in the second device, and the at least one response may be input through an interface of the application.

The survey list may be transmitted to the second device after receiving a second signal from the user device, and the survey list may be generated based on the second information that is stored in the database if the user is authenticated.

The second information may be newly input and inserted into the second signal if the user is not authenticated, and the survey list may be generated based on the newly input second information.

The result may comprise preferences of users based on responses received from a plurality of user devices.

According to yet another aspect of exemplary embodiments, there is provided a method of providing a survey of a program. The method comprises transmitting a first signal for the program that is being reproduced in a first device to a server, receiving a survey list from the server and transmitting an input in response to the received survey list to the server.

The method may further comprise: transmitting a second signal related to the program to the server; and receiving from the server a result generated based on first information related to a second device, included in the second signal, and second information that is stored in the server, wherein the first signal is generated based on the result.

The first signal may comprise third information input through an interface if a user is not authenticated.

An aspect of exemplary embodiments may provide a server and a method capable of providing survey results obtained by compiling preferences of viewers through a survey of a program.

BRIEF DESCRIPTION OF THE DRAWINGS

Non-limiting and non-exhaustive exemplary embodiments will be described in conjunction with the accompanying drawings. Understanding that these drawings depict only exemplary embodiments and are, therefore, not to be intended to limit its scope, the exemplary embodiments will be described with specificity and detail taken in conjunction with the accompanying drawings, in which.

DETAILED DESCRIPTION OF EXEMPLARY EMBODIMENTS

Figure 1:
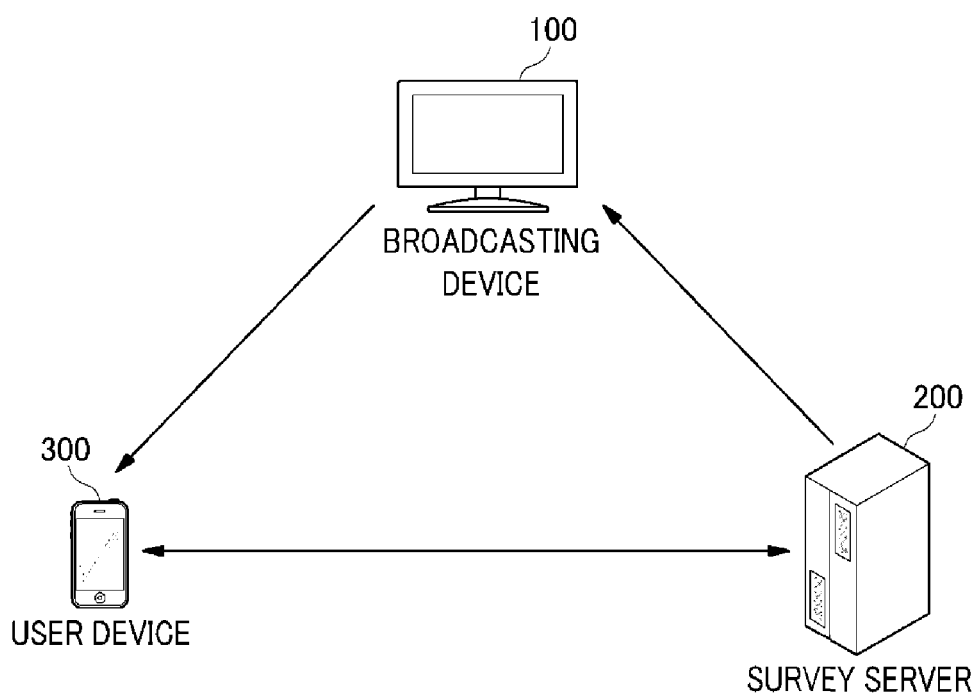
FIG. 1 is a view illustrating a configuration of a survey system according to an exemplary embodiment.

Hereinafter, exemplary embodiments will be described in detail with reference to the accompanying drawings to be readily implemented by those skilled in the art. However, it is to be noted that the present disclosure is not limited to the exemplary embodiments, but can be realized in various other ways. In the drawings, certain parts not directly relevant to the description of exemplary embodiments are omitted to enhance the clarity of the drawings, and like reference numerals denote like parts throughout the whole document.

Throughout the whole document, the terms "connected to" or "coupled to" are used to designate a connection or coupling of one element to another element, and include both a case where an element is "directly connected or coupled to" another element and a case where an element is "electronically connected or coupled to" another element via still another element. Further, each of the terms "comprises," "includes," "comprising," and "including," as used in the present disclosure, is defined such that one or more other components, steps, operations, and/or the existence or addition of elements are not excluded in addition to the described components, steps, operations and/or elements.

Hereinafter, exemplary embodiments will be explained in detail with reference to the accompanying drawings.

FIG. 1 is a view illustrating a configuration of a survey system according to an exemplary embodiment.

The survey system includes a broadcasting device 100, a survey server 200, and a user device 300. Here, the broadcasting device 100 is capable of reproducing a broadcasting program, and may include a TV, an IPTV, and so on.

The user device 300 may be embodied as a computer or a mobile device that can be connected to a remote server through a network. Here, the computer includes a note book equipped with the web browser, a desktop, a laptop, and others. For example, the mobile device is a radio communication device assuring portability and mobility and may include all types of handheld-based radio communication devices such as a personal communication system (PCS), a global system for mobile communications (GSM), a personal digital cellular (PDC), a personal handyphone system (PHS), a personal digital assistant (PDA), an international mobile telecommunication (IMT)-2000, a code division multiple access (CDMA)-2000, a W-code division multiple access (W-CDMA), a wireless broadband Internet (WIBRO) device, and a smart phone.

The survey server 200 may provide the user device 300 with a survey list of a broadcasting program that is being reproduced in the broadcasting device 100. The survey list may include information related to a survey that is being or will be conducted. The survey server 200 may provide the broadcasting device 100 with survey result generated based on a survey response to the survey list, received from the user device 300 and user information previously stored in the survey server 200.

First, once a user who is viewing a broadcasting program selects an icon displayed on the broadcasting device 100 for a survey of the broadcasting program, a push signal is transmitted from the broadcasting device 100 to the user device 300. In this case, the push signal is intended to execute a survey application of the user device 300.

A survey participation signal generated in response to the push signal is transmitted to the survey server 200. In this case, the survey participation signal may be generated by the survey application.

The user device 300 may generate the survey participation signal through the survey application and display a survey list received from the survey server 200. In this way, the user responds to the survey list through the user device 300, such that the user device 300 may generate a survey response and transmit the generated survey response to the survey server 200.

The survey server 200 may receive survey responses from the user device 300, and generate a survey result. Further, the survey server 200 may receive survey responses from multiple user devices, and generate a survey result that statistically presents preferences of users. The survey server 200 may transmit the generated survey result to the broadcasting device 100.

Accordingly, the user who is viewing the broadcasting program through the broadcasting device 100 can participate in the survey of the broadcasting program by using the user device 300 and identify a survey result from the broadcasting device 100.

For example, once a user participates in a survey of a product through the user device 300 while viewing a home shopping channel and responds to the survey, the survey server 200 may provide the broadcasting device 100 with a survey result categorized by fields related to the product, such as gender and age, a based on survey responses received from multiple user devices including the user device 300.

Accordingly, among various options such as colors and designs of the product that the user wants to buy, the user can identify options of the product with high preferences or responses, so that the user can make an informed purchase of the product.

Meanwhile, the product provider or seller may receive the compiled survey result and analyze preferences of customers that have participated in the survey by grouping the customers by, for example, gender and age. The product provider or seller may utilize the analyzed survey result for marketing activities such as customized advertisement.

Figure 2:
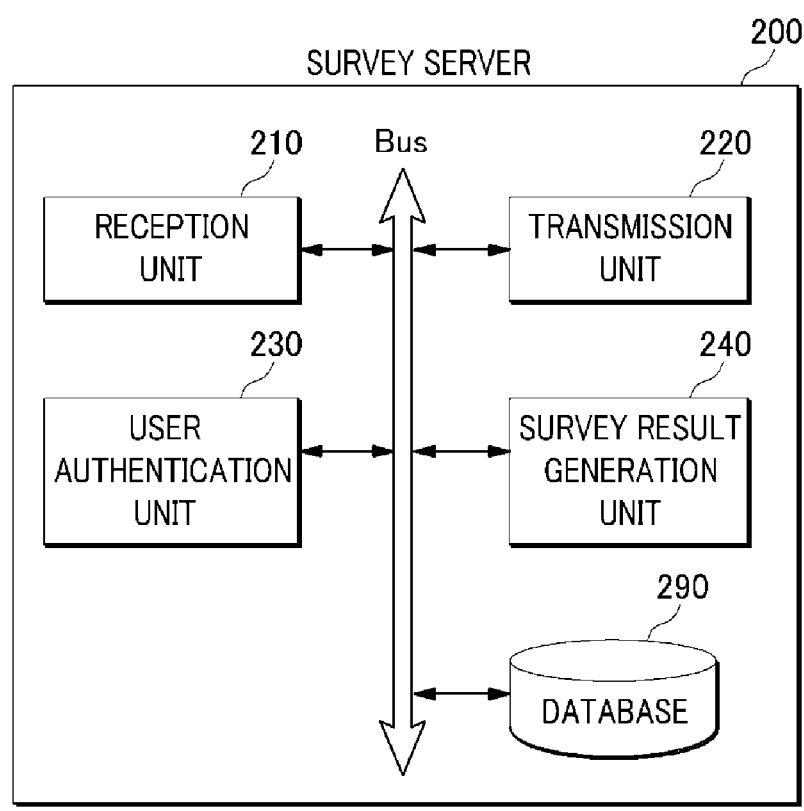
FIG. 2 is a block diagram illustrating a survey server according to an exemplary embodiment.

FIG. 2 is a block diagram illustrating a survey server according to an exemplary embodiment.

With reference to FIG. 2, the survey server 200 includes a reception unit 210, a user authentication unit 230, a transmission unit 220, survey result generation unit 240 and a database 290.

The reception unit 210 may receive the survey participation signal for the broadcasting program that is being reproduced in the broadcasting device 100 from the user device 300.

In this case, the survey participation signal may be generated in response to the push signal transmitted from the broadcasting device 100 to the user device 300 when a certain icon displayed on the broadcasting device 100 is selected by user input at the broadcasting device 200. Here, the push signal is intended to execute the survey application of the user device 300. The survey participation signal may be generated by the survey application.

The reception unit 210 may receive a survey response to the survey list from the user device 300.

The reception unit 210 may receive a survey list request from the user device 300.

The user authentication unit 230 may authenticate the user based on identification information of the user device 300 included in the received survey participation signal and user information that is previously stored in a database 290. That is, the user authentication unit 230 may authenticate the user depending on whether the identification information of the user device 300 and the user information are matched with each other.

The user device 300 may display the survey list through the survey application and receive the survey response to the survey list received by the reception unit 210. That is, the user device 300 may display survey inquiries through the survey application and acquire the survey response from the user.

The transmission unit 220 may transmit a user authentication result related to whether the user has been authenticated, to the user device 300.

The transmission unit 220 transmits the survey list for the broadcasting program to the user device 300. Further, the transmission unit 220 may transmit the survey list to the user device 300 when the survey list request signal for the broadcasting program received by the reception unit 210 is received from the user device 300.

Here, the survey list may be different depending on the user information. For example, the survey list may include different survey inquiries depending on the user information such as gender and age of the user.

That is, the survey list may be generated based on the user information and sent to the user device 300.

In this case, if the user is authenticated by the user authentication unit 230, the survey list may be generated based on the user information. If the user is not authenticated by the user authentication unit 230, the survey list request signal may include user information newly input from the user device 300.

For example, if the user is authenticated by the user authentication unit 230, i.e., if the user information is included in the user information pre-stored in the database 290, the survey list generated based on the authenticated user information may be transmitted to the user device 300.

If the user is not authenticated by the user authentication unit 230, i.e., if the user is not included in the user information pre-stored in the database 290, the user device 300 may receive newly input user information about the user, and transmit the newly input user information to the survey server 200. In this case, the user device 300 may receive input of the user information through the survey application.

The transmission unit 220 may transmit a survey result generated by the survey result generation unit 240.

Meanwhile, the transmission unit 220 may transmit at least one information about an advertisement or broadcasting based on the survey result, to the user device 300.

For example, the transmission unit 220 may transmit information about an advertisement or broadcasting about the product associated with the survey result to the user device 300. As an example, if a woman in her twenties of has participated in a survey while viewing a home shopping channel for sale of blouses, the transmission unit 220 may transmit information about an advertisement or a broadcasting about skirts that may be coordinated with the blouses, among cosmetics, skirts, blouses, and other items the woman would be interested, to the user device 300, so that the user is exposed to such items.

The survey result generation unit 240 may generate the survey result based on the survey response to the survey list and the user information. The survey result may be generated based on multiple survey responses received by the reception unit 210 from multiple user devices.

The survey result may include preferences of users based on the survey responses received from the multiple user devices.

Figure 3:
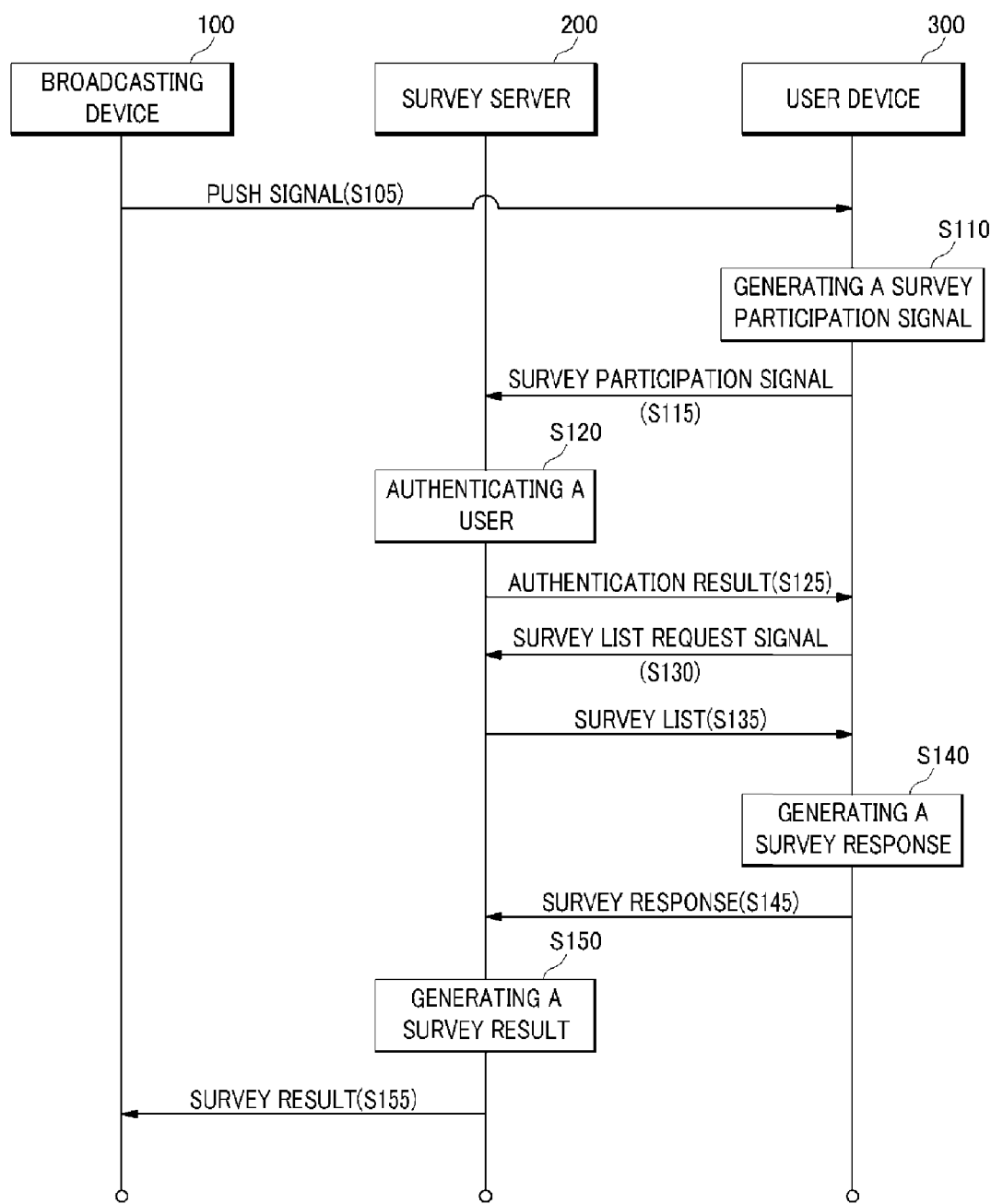
FIG. 3 is a flow diagram illustrating a survey providing method according to an exemplary embodiment.

FIG. 3 is a flow diagram illustrating a survey providing method according to an exemplary embodiment.

In operation S105, the broadcasting device 100 may transmit a push signal to the user device 300. When a user selects an icon displayed on the broadcasting device 100 while viewing a broadcasting program, the push signal may be transmitted from the broadcasting device 100 to the user device 300. In this case, the push signal may be intended to execute the survey application of the user device 300.

In operation S110, the user device 300 may generate a survey participation signal in response to the received push signal, and in operation S115, the user device 300 may transmit the generated survey participation signal to the survey server 200. In this case, the survey participation signal may include identification information of the user device 300.

In operation S120, the survey server 200 may authenticate the user based on identification information of the user device 300 included in the survey participation signal and the user information that is previously stored in a database. In this case, the survey server 200 may authenticate the user depending on whether the identification information of the user device 300 included in the survey participation signal and the previously stored user information are matched with each other.

In operation S125, the survey server 200 may transmit the user authentication result as to whether the user has been authenticated in operation S120, to the user device 300.

In operation S130, the user device 300 may transmit the survey list request signal to the survey server 200. In this case, if the user is not authenticated according to the user authentication result, the user device 300 may receive user information newly input through the survey application of the user device 300, and transmit the survey list request signal including the newly input user information to the survey server 200.

In operation S135, the survey server 200 may transmit a survey list of the broadcasting program to the user device 300. That is, the survey server 200 may transmit the survey list to the user device 300 when the survey list request signal for the broadcasting program is received from the user device 300. Here, the survey list may include different survey inquires relating to gender, age, and other categories of information, based on the user information.

If the user has been authenticated, the survey list may be generated based on the previously stored user information.

If the user has not been authenticated, the survey list may be generated based on the newly input user information from the user device 300 included in the survey list request message.

In operation S140, thereafter, the user device 300 may generate a survey response to the received survey list. Once the user inputs an answer corresponding to the survey list by using the user device 300, the user device 300 may generate the survey response to the survey list.

In operation S145, the user device 300 may transmit the generated survey response to the survey server 200.

In operation S150, the survey server 200 may generate a survey result based on the survey response. In this case, the survey server 200 may receive survey responses from multiple user devices including the user device 300 and generate the survey result that statistically presents preferences of viewers.

In operation S155, the survey server 200 may transmit the survey result to the broadcasting device 100. The survey server 200 may transmit at least one information about an advertisement or a broadcasting that correspond to the survey result, to the user device 300.

Exemplary embodiments may be embodied in a transitory or non-transitory storage medium which includes instruction codes which are executable by a computer or processor, such as a program module which is executable by the computer or processor. A data structure according to exemplary embodiments may be stored in the storage medium and executable by the computer or processor. A computer readable medium may be any usable medium which can be accessed by the computer and includes all volatile and/or non-volatile and removable and/or non-removable media. Further, the computer readable medium may include any or all computer storage and communication media. The computer storage medium may include any or all volatile/non-volatile and removable/non-removable media embodied by a certain method or technology for storing information such as, for example, computer readable instruction code, a data structure, a program module, or other data. The communication medium may include the computer readable instruction code, the data structure, the program module, or other data of a modulated data signal such as a carrier wave, or other transmission mechanism, and includes information transmission mediums.

The above description of exemplary embodiments is provided for the purpose of illustration, and it will be understood by those skilled in the art that various changes and modifications may be made without changing a technical conception and/or any essential features of the exemplary embodiments. Thus, the above-described exemplary embodiments are exemplary in all aspects, and do not limit the present disclosure. For example, each component described to be of a single type can be implemented in a distributed manner. Likewise, components described to be distributed can be implemented in a combined manner.

The scope of the present inventive concept is defined by the following claims and their equivalents rather than by the detailed description of exemplary embodiments. It shall be understood that all modifications and embodiments conceived from the meaning and scope of the claims and their equivalents are included in the scope of the present inventive concept.

What is claimed is:

1. An apparatus for providing a survey of a program, the apparatus comprising:
   a receiver configured to receive a first signal from a second device related to the program that is being reproduced in a first device;
   an authenticator configured to authenticate a user based on first information of the second device included in the received first signal and second information that is stored in a database;
   a transmitter configured to transmit a survey list related to the program to the second device in response to said first signal; and
   a result generator configured to generate a result based on at least one response to the survey list and the second information,
   wherein the at least one response is received by the receiver,
   the transmitter is further configured to transmit the generated result to the first device, and
   the survey list comprises one or more different inquiries,
   wherein the first signal is generated in response to a second signal, and
   the second signal is transmitted from the first device to the second device when an icon displayed on the first device is selected by first input to the first device.

2. The apparatus of claim 1, wherein an application of the second device is executed based on the second signal, and
   the first signal is received from the second device and generated by the application.

3. The apparatus of claim 2, wherein the survey list is displayed in the second device, and the at least one response is input through an interface of the application.

4. The apparatus of claim 1, wherein the result comprises preferences of users based on responses received from a plurality of user devices.

5. An apparatus for providing a survey of a program, the apparatus comprising:
   a receiver configured to receive a first signal from a second device related to the program that is being reproduced in a first device;
   an authenticator configured to authenticate a user based on first information of the second device included in the received first signal and second information that is stored in a database;
   a transmitter configured to transmit a survey list related to the program to the second device in response to said first signal; and
   a result generator configured to generate a result based on at least one response to the survey list and the second information,
   wherein the at least one response is received by the receiver,
   the transmitter is further configured to transmit the generated result to the first device, and
   the survey list comprises one or more different inquiries,
   the survey list is transmitted to the second device after a second signal is received from the second device, and
   the survey list is generated based on the second information that is stored in the database if the user is authenticated.

6. The apparatus of claim 5, wherein the second information is newly input and inserted into the second signal if the user is not authenticated, and
   the survey list is generated based on the newly input second information.

7. The apparatus of claim 1, wherein the transmitter is further configured to transmit at least one from among information about an advertisement and information about a broadcasting, based on the result.

8. A method of providing a survey of a program, the method comprising:
   receiving a first signal from a second device related to the program that is being reproduced in a first device;
   authenticating a user based on first information of the second device included in the received first signal and second information that is stored in a database;
   transmitting a survey list related to the program to the second device in response to said first signal;
   receiving at least one response;
   generating a result based on the at least one response to the survey list and the second information; and
   transmitting the generated result to the first device, wherein the survey list comprises one or more different inquiries, wherein the first signal is generated in response to a second signal, and wherein the second signal is transmitted from the first device to the second device when an icon displayed on the first device is selected by input to the first device.

9. The method of claim 8, wherein an application of the device is executed based on the second signal, and the first signal is received from the second device and generated by the application.

10. The method of claim 9, wherein the survey list is displayed in the second device, and the at least one response is input through an interface of the application.

11. A method of providing a survey of a program, the method comprising:

receiving, by an apparatus, a first signal from a second device related to the program that is being reproduced in a first device;

authenticating a user based on first information of the second device included in the received first signal and second information that is stored in a database;

transmitting a survey list related to the program to the second device in response to said first signal;

receiving at least one response;

generating, by the apparatus, a result based on the at least one response to the survey list and the second information; and transmitting the generated result to the first device, wherein the survey list comprises one or more different inquiries, wherein the survey list is transmitted to the second device after a second signal is received from the second device, and wherein the survey list is generated based on the second information that is stored in the database if the user is authenticated.

12. The method of claim 11, wherein the second information is newly input and inserted into the second signal if the user is not authenticated, and the survey list is generated based on the newly input second information.

13. The method of claim 8, wherein the result comprises preferences of users based on responses received from a plurality of user devices.

14. A method of providing a survey of a program, the method comprising:

transmitting a first signal from a second device for the program that is being reproduced in a first device, to a server;

receiving a survey list from the server, the survey list being transmitted from the server in response to the first signal; and transmitting an input in response to the received survey list to the server, wherein the survey list comprises one or more different inquiries, wherein the first signal is generated in response to a second signal, and wherein the second signal is transmitted from the first device to the second device when an icon displayed on the first device is selected by input to the first device.

15. The method of claim 14, further comprising:

transmitting a second signal related to the program to the server; and receiving from the server a result generated based on first information related to the second device, included in the second signal, and second information that is stored in the server, wherein the first signal is generated based on the result.

16. The method of claim 15, wherein the first signal comprises third information input through an interface if a user is not authenticated.

* * * * *